INVENTORS
CHARLES E. BERRY
MARIO T. CICHELLI

June 13, 1961  C. E. BERRY ET AL  2,987,767
FLUID FORMING OF PLASTICS
Filed March 5, 1959                     5 Sheets-Sheet 2

INVENTORS
CHARLES E. BERRY
MARIO T. CICHELLI
BY  *Herbert M. Wolfson*
ATTORNEY

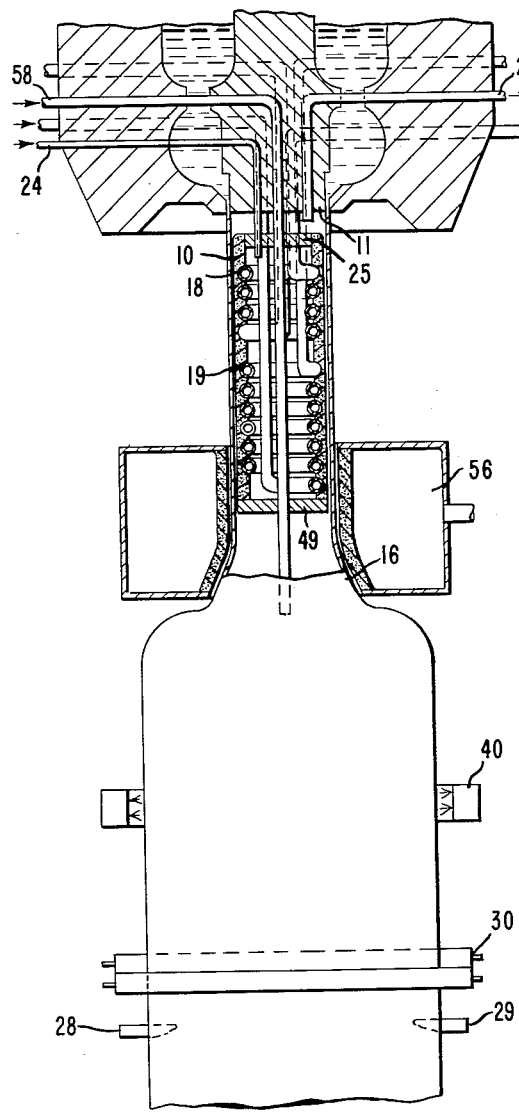
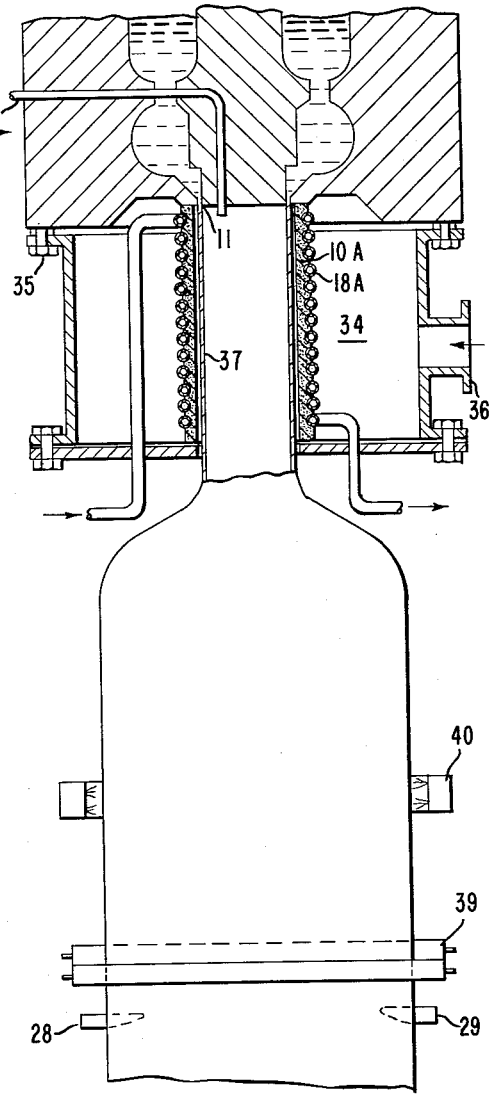

INVENTORS
CHARLES E. BERRY
MARIO T. CICHELLI
ATTORNEY

June 13, 1961  C. E. BERRY ET AL  2,987,767
FLUID FORMING OF PLASTICS

Filed March 5, 1959  5 Sheets-Sheet 5

INVENTORS
CHARLES E. BERRY
MARIO T. CICHELLI

BY *Herbert M. Wolfson*
ATTORNEY

United States Patent Office

2,987,767
Patented June 13, 1961

---

2,987,767
FLUID FORMING OF PLASTICS
Charles Edward Berry and Mario T. Cichelli, Wilmington, Del., assignors to E. I. du Pont de Nemours and Company, Wilmington, Del., a corporation of Delaware
Filed Mar. 5, 1959, Ser. No. 797,373
16 Claims. (Cl. 18—14)

This invention relates to a process for the forming of thermoplastics, and particularly to a process for continuously forming tubular thermoplastic stock to a predetermined cross section greater than the original cross section by the use of gas pressure.

This application is a continuation-in-part of our co-pending application Serial No. 665,053, filed June 11, 1957, now abandoned.

Tubular thermoplastic stock made from polymeric substances has hitherto been stretched by pulling over mandrels of progressively increased diameter, or by expanding the tubing by the introduction of a fluid under pressure to the interior of the stock and thereby stretching it radially outwards. Mechanical stretching is objectionable because the stock is brought into contact with the mandrel and the surfaces thereby marred, particularly when the polymeric material is in the softened state, as is often the case. Also, rather high force application is necessary to draw the tubular stock over the expanding mandrel and this is deleterious to the web, as well as objectionable, in that heavy, expensive equipment is required. Expansion of tubes in a radial direction outwards through the agency of internally applied gas pressure is practicable; however, difficulties are encountered in supporting the film from the outside and this introduces a lack of control into the process.

Recently, attempts have been made to utilize differential gas pressure on opposite sides of a tubular stock in the course of molding, an example of which is taught in U.S. Patent 2,519,375, but surface contact with an outer cylindrical cooling section is preserved and the application of gas pressure from the outside is limited solely to the prevention of contact during the short interval when the molten polymer escapes from the annular die and before it is set to sufficient hardness to permit its contact with the outer cylindrical cooling section, so that there is practically no stretching to increased cross section.

A primary object of this invention is to provide a gas pressure forming process and apparatus for thermoplastic materials which is adapted for use in stretching tubing stock to a greater cross section than as received. Another object of this invention is the provision of a gas pressure forming process and apparatus for thermoplastic polymeric materials which obviates any contact between the tubular stock in process and the solid surfaces of the apparatus employed. Other objects of this invention include the provision of an apparatus for continuously enlarging the cross section of tubular thermoplastic polymeric stock which is readily fabricated in a variety of sizes and shapes suited to commercial production, which is of a design permitting very precise and uniform temperature maintenance within adjacent sections of the apparatus, and which is low in first cost and also in maintenance expense. In this latter regard, an additional object involves a design permitting maintenance of the tubing stock at a temperature favorable for effecting molecular orientation of the polymeric tubing and enlargement of the cross section of the tubular stock to effect molecular orientation thereof.

The manner in which these and other objects of this invention are obtained is set out in the detailed description and represented in the following drawings, of which:

FIGURES 4 and 5 are partially schematic views in longitudinal section of other embodiments of apparatus wherein tubular thermoplastic polymeric stock is stretched by the application of gas pressure from the interior under conditions of free expansion, i.e., no solid surfaces defining the limiting cross section of the tubing are used in the region of final cross section.

Figure 1:
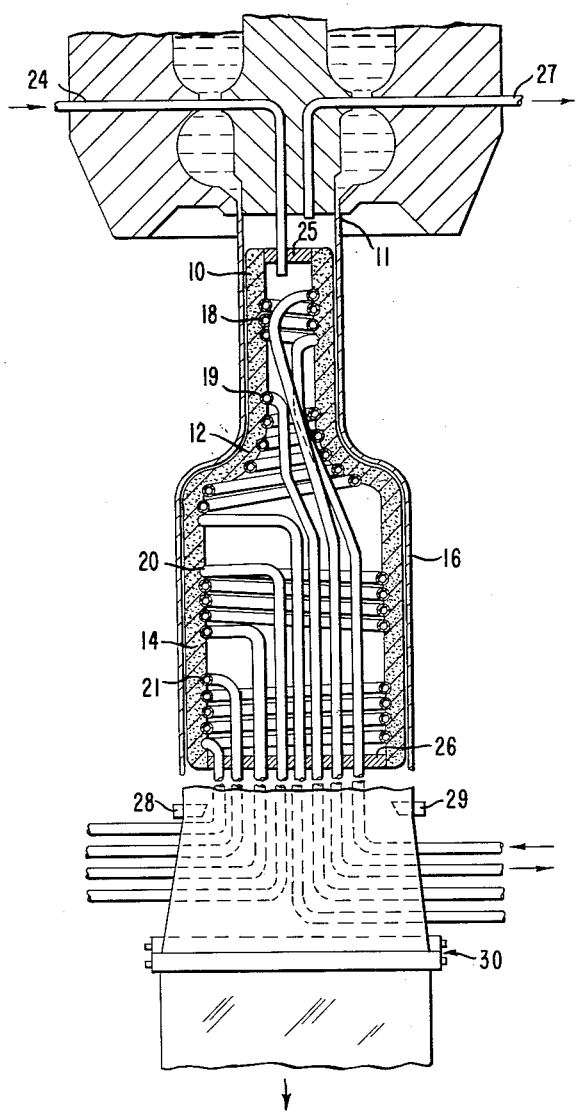
FIGURE 1 is a partially schematic view in longitudinal section of a preferred embodiment of an apparatus according to this invention which is adapted to the stretching of tubular thermoplastic polymeric stock while retaining a circular cross section by application of gas pressure solely from the interior of the stock.
Figure 6:
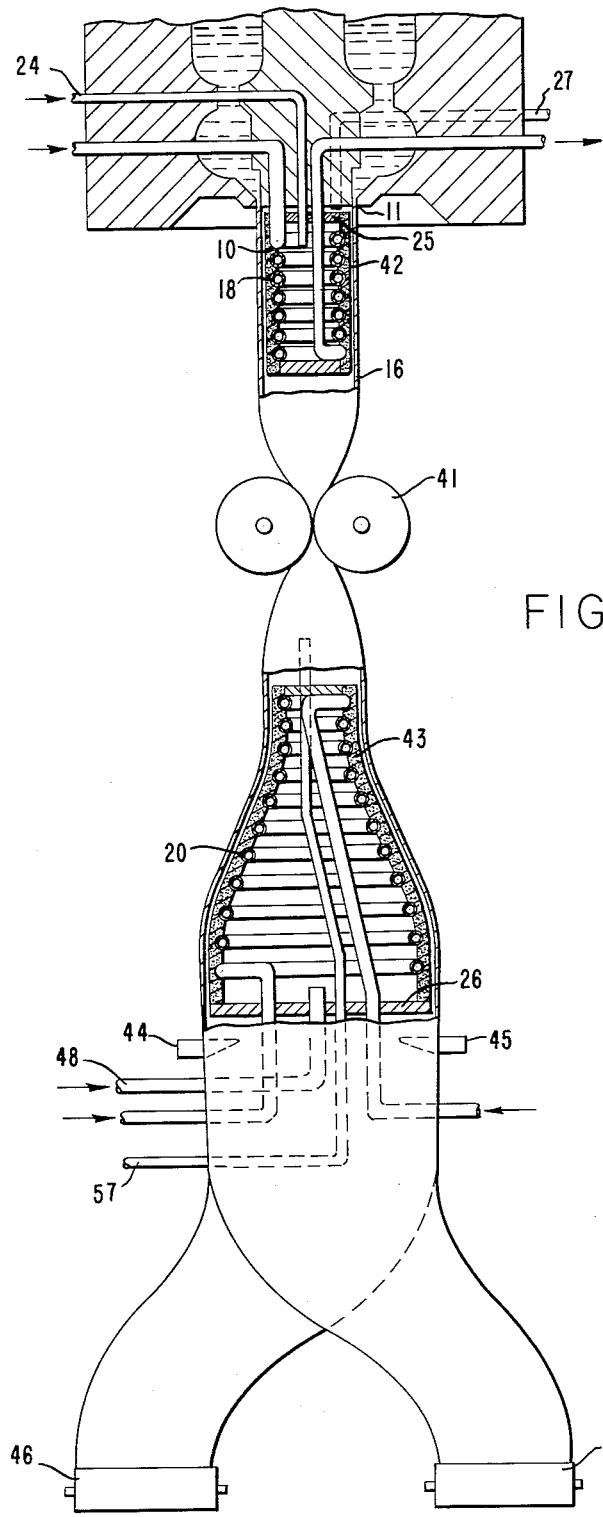
Figure 7:
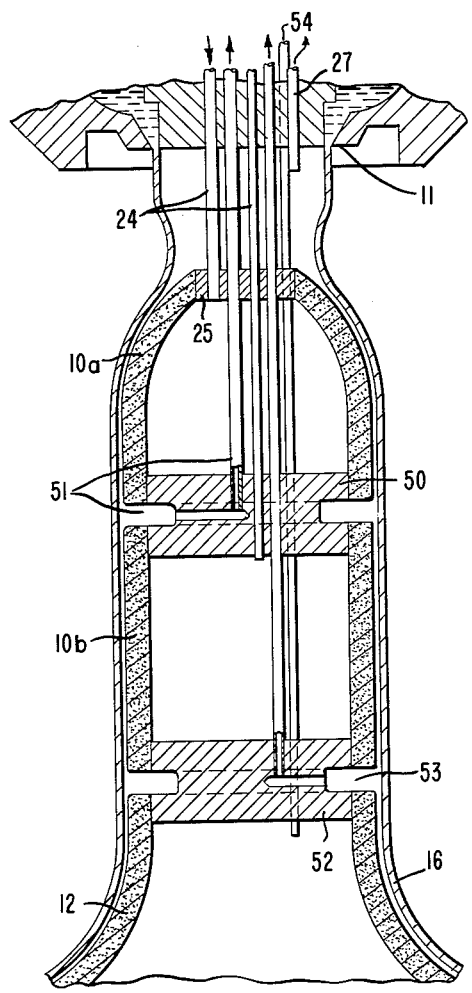

FIGURE 6 is a partially schematic view in longitudinal section of another embodiment of apparatus wherein the region of initial limiting cross section and the region of final limiting cross section (the stretching region) are separate; and FIGURE 7 is a detail of part of the former of the general type used in FIGURE 1, showing a configuration of the nose cone and also the application of channels and annuli for withdrawal of accumulating gas.

Generally, the objects of this invention are accomplished by progressively advancing the tubular thermoplastic polymeric stock in process from a region of an initial limiting cross section to a region of a final limiting cross section while applying gas at superatmospheric pressure against the surface thereof in an amount sufficient to sustain the stock out of contact with the solid surfaces defining the limiting regions, and maintaining the temperature of the stock at levels necessary to form the thermoplastic to the desired final state. As shown in FIGURES 4 and 5, the objects may also be accomplished, with admittedly less control, by applying gas at superatmospheric pressure against the surface of the advancing tubular thermoplastic stock to sustain the stock out of contact with the solid surface defining the initial region of limiting cross section until the tubular stock is capable of withstanding substantial pressure and then permitting the tubular stock to freely expand to a larger diameter under controlled internal pressure conditions.

Referring to FIGURE 1, a preferred apparatus for stretching tubular thermoplastic stock 16 while retaining a circular cross section consists of a sintered metal former supplying gas outwardly therefrom towards the thermoplastic, which apparatus is disposed with its longitudinal axis vertical and which consists of three sections aligned end to end. The first section 10, which receives the molten thermoplastic discharged from the annular die 11, is cylindrical in shape and the lower end abuts the small end of a frusto-conical stretcher section 12, the large end of which, in turn, abuts against one end of a second cylindrical section 14 of a diameter approximating the final desired internal diameter of the thermoplastic product. Since the progress of the tubular stock is from section 10, over section 12 and thence out of the apparatus over section 14, the points of transition from one section to a neighboring section should be smooth and gradual. If desired, several sections may be made integral as shown; however, from the standpoint of ease of fabrication as well as independent temperature maintenance in a given section and better control of the clearance between the stock and the former, it may be preferable to make up the sections as separate entities and insulate the points of juncture to minimize heat transfer by conduction from one section to another.

In addition, in many practical instances it will be desirable to separate the porous surface sections from one another or into subsections in order to provide for annular air withdrawal passages to prevent the excessive accumulation of air along the length of the apparatus; an example of this separation by spool pieces 50 and 52 is provided in FIGURE 7. Also shown in FIGURE 7, and discussed subsequently, is a detail of a variation of the nose of the first section 10.

The application of gas pressure according to this invention is over the entire working surface area of the apparatus and, therefore, sections 10, 12 and 14 are fabricated from a gas-pervious material which is preferably metallic, such as a sintered metal, e.g., bronze or the like. In a typical apparatus, the section walls were fabricated from ½" thick sintered bronze metal having a porosity of about 27% on the volumetric basis, which permitted the passage of about 5 ft.$^3$/(min.) of air per square foot of metal surface at 5 lbs./sq. in. gage differential across the metal. Instead of sintered metal other gas-pervious structures may be employed, such as, for example, aggregates of small metal balls of the size of birdshot point-welded or soldered together so as to provide through-going air passages relatively uniform in both size and distribution. Or sintered wire matrices in a variety of forms are satisfactory, as are pervious metal-ceramic composites characterized by thermal conductivities approaching those of metals. Instead of air as the gas passed through the gas-pervious structure, any gas substantially inert toward the polymeric stock may be used. Thus, the gas may be air, nitrogen, argon, etc.

In an installation adapted to expand polyethylene terephthalate stock from an inside diameter of about 14" to a final internal diameter of about 42", the relative lengths of the several sections in terms of the internal diameter of the feed stock as received measured along the longitudinal axis of the former were in the ratios of 2:5:4 in the order of sections 10, 12 and 14. In this operation, it was first necessary to quench the molten polymer ejected from die 11 at a temperature of about 550° F. (288° C.) to a temperature below the stretch temperature, and this was accomplished by cooling section 10 internally with a helical cooling coil 18 soldered in intimate contact with the internal surface of section 10. The expansion had to be conducted on yielding film that was warmer but still relatively strong and self-supporting, which was achieved by heating to the stretch temperature, i.e., about 195° F. (91° C.) in section 12 with a helical coil 19 mounted adjacent the interior wall of section 12 and soldered thereto. The final section 14 was used to cool the film (with the aid of cooling coils 20 and 21) to a temperature of about 100° F. before slitting with knives 28 and 29 and winding on rolls.

When heat-setting is desired, the tubing, after stretching and cooling but before slitting, may be passed through a set of pull-rolls similar to rolls 41 in FIGURE 6 and then passed over a heat-set section of porous former having a diameter equal to that of the tubing where the tubing is heated to a temperature of about 400° F. and, thereafter, cooled by a second section of porous former of the same diameter prior to slitting and winding on rolls.

For the polyethylene terephahtlate tube stretching apparatus described, air was utilized as the pressurized gas, the air being introduced to the interior of the three-section former through supply line 24. A pressure of 1 lb./sq. in. gage was maintained on the inside of the former consisting of sections 10, 12 and 14, escape through the ends being prevented by inset closures 25 at the top and 26 at the bottom. The sections 10, 12 and 14 were made of a fine-pore sintered metal, so that at the applied pressure the volumetric velocity of gas flow through the pores was of the order of 0.01 cu. ft./min. per square foot of pervious surface. Under these circumstances, the air escapes through the porous metal to the exterior surfaces of the former and buoys the tubular stock 16 away from the metal surfaces, while yet maintaining it in such close proximity therewith that a very thin gas layer of a thickness of less than about 10 mils, generally 3-10 mils, is preserved between the thermoplastic and the former, thereby permitting rapid and uniform heat transfer from the former surface to the tubing stock in process. A copending application, Serial No. 765,715, filed August 22, 1958, is directed specifically to heat transfer through the agency of thin gaseous films maintained by gas-pervious materials. The supporting action of the gas escaping through the outside interstices of the former is such that at no point does the stock touch the metal of the structure and, accordingly, the product is protected from marring or wrinkling.

The tubular stock is advanced over the former by a pull roll set 30 located beyond the former at a point clear of the temperature-regulating liquid supply lines which, in this instance, connect with the former through the bottom closure 26. The force required to move the stock through the apparatus depends, of course, on the degree of stretching involved and also on the gage of the material as received, a force of about 40 lbs. being necessary to stretch polyethylene terephthalate tubing of 2.5 mil gage at a temperature of 195° F. (91° C.) from 14" diameter to 42" diameter.

An air pressure relief line 27 is preferably provided for venting the interior of the tubular infeed to prevent any bulging from entrapped air at this point where the thermoplastic material is relatively soft and weak. The apparatus of FIGURE 1 is intended to produce planar sheets as the final product and slitter knives 28 and 29 are provided on opposite sides of the escaping tubing past the former, where the thermoplastic is cool and strong, to cut the tube into two flat sheets. The sheet product is subsequently wound on rolls (not shown) in a conventional manner not further detailed herein.

Figure 3:
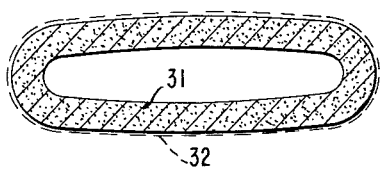
FIGURE 3 is a transverse cross sectional view of an embodiment of stretching section according to this invention adapted to produce a product of elongated cross section from circular cross section thermoplastic stock input, the product in process being shown in broken line representation.

The former 12 shown in FIGURE 1 is circular in cross section although this invention is not limited to apparatus of any specific cross section. Thus, FIGURE 3 is a representation in cross section of a stretching section 31 having a somewhat elliptical shape which is adapted to receive stock extruded in circular cross section and thereafter stretch it to not only a greater inside area but also a different configuration, such as that indicated by broken line at 32. It will be understood that the transitional region between an input section of circular cross section, such as 10 of FIGURE 1 and stretching section 31 must be shaped with reference to 10 to impart a gradual and progressive stretch and change in shape to the stock and, of course, the section receiving the output, corresponding to 14 of FIGURE 1, will have the same cross section as 31. If the product is not to be slit longitudinally, but is instead marketed as tubing of non-circular cross section, the connection of the temperature-regulating liquid supply lines will be made from the top through closure 25 and the entire apparatus supported from the supply lines or from the extrusion die mounting structure, so that the pull roll set removes the product from the apparatus as continuous tubing.

In the operation of the apparatus to be described subsequently, the particular quantity of gas that must be supplied through the porous former at any given position along the path of movement of the film will depend upon the tensile stress required at the given position to cause the film to stretch to a predetermined diameter or to prevent it from shrinking to a smaller diameter while maintaining it in either case within the prescribed 3–10 mil limits of clearance from the porous member.

Because the elastic and plastic properties of some materials vary rapidly with temperature in the ranges of interest, the pressure necessary for proper forming in one region may be too great for good results in adjoining regions. The excess pressure could result in distention or rupture of the film in the regions where it is weak. The constructional variations in FIGURE 7 show how the former may be divided into different regions of pressure as required. At 10a and 10b is shown a cylindrical former that is subdivided into the two parts designated 10a and 10b by the spool piece 50 which serves two purposes, one to compartmentalize the high pressure side of the former so that different supply pressures may be imposed, and the other, and more important, to provide the withdrawal passage 51 so that the gas supplied through the pores of the various parts may be expelled from these parts without excessive pressure rise. Similarly, section 12 is separated from section 10b by spool piece 52 and withdrawal passage 53 is provided. Air for section 12 of the former is supplied through supply line 54.

For the sake of clarity and ease of understanding, the conduits and heating and cooling coils have been omitted from FIGURE 7, but it is obvious that they would appear as in FIGURE 1.

FIGURE 7 also shows a conical nose on the leading end of the first section 10a of the former, of a greater convergence than the barely rounded nose of section 10 in FIGURE 1. A conical nose of this sort would be used with polymers that are very soft at their extrusion temperature, to expand them gradually while cooling until they reach the desired quench diameter and thereby avoiding the sudden application of excessive, and possibly rupturing, pressure at the entering section.

Not shown in FIGURE 7, but obvious in view of the preceding explanation, is the possibility of having portions of the former converge in the direction of flow during part of the quench operation to allow the film to shrink with little or no resisting stress until its temperature fell to a level where the film had sufficient strength to be stretched without rupturing.

It is further possible to design these formers with different porosity in their several sections, so that the supporting gas rate in the various sections may vary, and in turn would vary the spacing of the film from the heat transfer surface and thereby the heat transfer rate.

Figure 2:
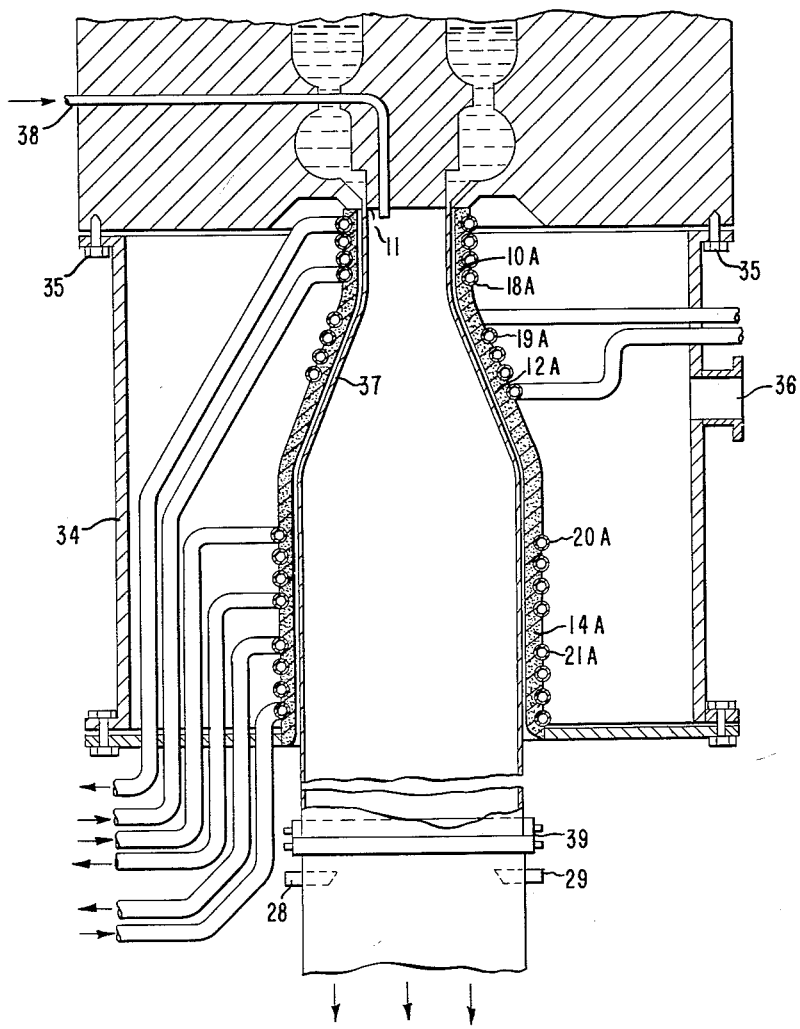
FIGURE 2 is a partially schematic view in longitudinal section of another embodiment of apparatus wherein tubular thermoplastic polymeric stock is stretched with retention of circular cross section by the application of gas pressure from the interior while, at the same time, counterbalancing gas pressure is applied exteriorly.

The apparatus of FIGURE 2, the elements of which are circular in cross section, is intended to stretch a thermoplastic tube in a diametral sense through the agency of gas pressure applied both interiorly and exteriorly. In this arrangement, the sections corresponding to the several sections of the apparatus of FIGURE 1 are designated by the same reference numerals, except that the letter "A" is appended. Thus, the several former sections are designated 10A, 12A and 14A and the corresponding temperature maintenance coils are denoted 18A, 19A, 20A and 21A, respectively. In FIGURE 2, it should be noted that 19A may be either a heating or cooling coil depending on the temperature of the film leaving section 10A. Molten thermoplastic polymer is supplied to the inside of the former by discharge through annular die 11. To permit supply of air in the reverse direction as compared with the apparatus of FIGURE 1, the former is enclosed within airtight jacket 34 which is secured to the under face of die 11 by screws 35. Air is supplied to jacket 34 through line 36, the pressure maintained within the jacket being about 5 lbs. gage. The air escapes through the interstices of the former and collects as a thin film on the interior surface thereof, thereby buoying tubular stock 37 out of contact with the metal surfaces of the former. In the apparatus of FIGURE 2, air pressure is provided interiorly of the stock to expand it into general conformity with the interior of the former, this air being supplied through line 38 opening within the tubular film product with pressure maintained at about ½ lb./sq. in. gage. To seal the air pressure within the web, the product is preferably pressed through a pinch roll set 39, which may additionally serve as a pull roll set advancing product through the apparatus, disposed far enough along the line of tubular travel so that there is no interference with full distention of the thermoplastic within the former. The product may again be split into two planar webs by slitter knives 28 and 29 located past pinch rolls 39, and the webs wound on conventional take-up rolls not shown or may be wound as lay-flat tubing without slitting.

The embodiment of apparatus shown in FIGURE 2 has the advantage that a somewhat reduced pull is required to process the stock through the apparatus and therefore thermoplastics having lower strengths at elevated temperatures can be stretched successfully. In addition, startup is relatively easier with the apparatus of FIGURE 2. On the other hand, the apparatus of FIGURE 1 has a simpler construction and is therefore less expensive to build. Moreover, the design of apparatus shown in FIGURE 1 is adapted to convert stock of circular cross section to a wide variety of non-circular cross sections and is therefore useful in this connection.

It will be understood that the formers hereinbefore described may, depending on the circumstances, be designed with more or fewer individual sections than those of FIGURES 1 and 2, and that the sections may also be provided with a wide variety of temperature-regulating coils in order to vary the characteristics of the polymeric tubular film in process to permit close control over the temperature at which ready stretching is performed and/or to provide pressure isolation between the zone in which the film is molten and the zone in which the film is stretched. Sometimes it is desirable to employ different air pressures within individual sections of the former, and this can be accomplished by independently supplying air to the several sections which are then sealed off one from another by transverse partitions. The use of transverse partitions with accompanying pressure relief channels has been discussed with regard to FIGURE 7. Other modifications of FIGURES 1 and 2 will be discussed hereinafter.

Thus, FIGURES 4 and 5 are modifications of FIGURES 1 and 2, respectively, using fewer sections than those shown in FIGURES 1 and 2. After cooling over or within sections 10 or 10A, the tubing is allowed to expand freely controlled solely by the actual positive internal pressure applied. Air vent 27 serves to prevent bulging of the tubing prior to and during quenching. In FIGURE 4 a second gas supply line 58 is utilized to provide for expansion of the tubing. The plug 49 is provided to force the gas to escape only through the porous surface of section 10. The short section of outside former with a trumpet-shaped mouth 56 encloses the lower end of the inside former, the space between the two porous faces being only wide enough to accommodate the film plus two layers of supporting gas, i.e., the film thickness at this location plus 6–20 mils. The overlap of the outside former with the inside former must be sufficient to prevent excessive gas flow backward from the stretching region. Such a closure is necessary in order to prevent the higher pressure in the stretching section from bleeding excessive gas back into the cooling section and thus causing the film to stretch prematurely. In practice, this section 56 can take the form of two half cylinders which are separated for the threading process and are brought together just prior to application of the stretching gas through line 58.

Alternatively, the inside former may be divided into two sections, one 18 to provide subcooling of the film to a temperature at which it will have considerable stiffness so that it can resist distention by the air from the stretching region and two, a reheating section 19 to raise the film temperature back to a level to permit stretching. It would be desirable to insert air withdrawal means near the location of minimum temperature so that any air that flows back through the reheating section from the expansion section will be withdrawn to the atmosphere rather than permitted to exert its effect in the quenching section.

Final cooling is accomplished by blowing air from nozzles 40 located around the periphery of the tubing. Such apparatus as shown in FIGURES 4 and 5 are useful for stretching films where gradual expansion, as provided in sections 12 and 12A of FIGURES 1 and 2, does not offer any improvement in the ultimate properties of the film over that obtained by the so-called free expansion shown in FIGURES 4 and 5.

FIGURE 6 is another modification of the apparatus wherein pull roll 41 is interspersed between the constant diameter section 42 and the section 43 in which the tubing is expanded by gas supplied through line 48. An air relief vent 57 is provided for section 43. In all other respects this apparatus is similar to the apparatus disclosed in FIGURE 1. After leaving the gas-pervious former 43, tubular stock 16 is cut by slitter knives 44 and 45. The two resulting slit sheets are wound on rolls 46 and 47. A so-called split apparatus as shown in FIGURE 6 may also be adapted from the embodiment shown in FIGURE 2 in a manner similar to that used in adapting FIGURE 6 from FIGURE 1.

The apparatus hereinbefore described possesses important advantages in combining excellent heat transfer with physical support of the product out of contact with the surfaces of the former. Many polymeric materials liberate heat on being stretched and thereby become weaker, and therefore subject to excessive stretching in thinner regions in relation to the stretching of thicker regions with accompanying poor gage control, unless the liberated heat is removed. The preferred apparatus of this invention is highly effective in maintaining the polymeric product at essentially balanced temperature throughout any specific area and improves gage control markedly.

The invention is also highly effective in obtaining molecular orientation of organic thermoplastic polymeric film in tubular form. Thus, the process which can be most easily described as one comprising the steps, in sequence, of extruding the thermoplastic polymeric material in the form of molten tubing, cooling the extruded tubing by advancing it in proximity to but out of contact with at least one former or cooling surface, simultaneously applying a gaseous medium through the cooling surface transverse to the direction of advancement of the tubing to maintain the tubing in proximity to but out of contact with the cooling surface and expanding the tubing to a larger diameter by applying a gaseous medium within the tubing, can easily be adapted to effect orientation by cooling the thermoplastic tubing after extrusion to a temperature within a range wherein the tubing is orientable and then expanding the tubing while it is maintained within this temperature range to produce molecular orientation of the polymeric tubing. Most of the molecular orientation due to expansion of the tubing is produced in the transverse direction. However, some orientation is effected in the longitudinal direction. The amount of orientation effected in the longitudinal direction depends in part on whether or not the expansion of the tubing is sudden or gradual, sudden expansion producing more orientation in the longitudinal direction than a gradual expansion.

It should also be mentioned that the heat transfer apparatus described and claimed in copending application, Serial No. 756,715 may be employed for effecting additional orientation in the longitudinal direction as well as providing a method of annealing or heat-setting the biaxially stretched tubular film. A convenient arrangement of apparatus involves passing the expanded tubing moving from an apparatus illustrated in FIGURE 1 or FIGURE 2 through pinch or pull rolls, such as those illustrated by 41 of FIGURE 6, and thereafter reinflating the tubing and causing it to pass through a gas-pervious ring or cylinder or allowing the inflated tubing to pass over a gas-pervious mandrel. During passage through or over the gas-pervious solid surfaces, the tubular film is heated to the appropriate temperature at which stretching and heat-setting are to be effected. To stretch the film in the longitudinal direction a final set of pull rolls is employed to pull the film in the longitudinal direction at a greater rate than the first set of pull rolls.

Such a process for orientation may be applied to a wide variety of organic and inorganic polymeric film-forming materials, particularly organic thermoplastic polymeric materials in tubular film form. The following types of organic, thermoplastic polymers are particularly suited for the orientation process described:

(1) Polymers which are normally amorphous (those which do not crystallize). This class includes polystyrene and polymethyl methacrylate.

(2) Polymers which are "crystallizable" or can be made to crystallize but which can be quenched in an essentially amorphous state. This class includes various polyesters, such as polyethylene terephthalate, copolyesters of ethylene terephthalate/ethylene isophthalate wherein the ethylene terephthalate component is at least 65%, by weight, of the total composition, polyethylene-2,6,naphthalate, polytetramethylene-1,2,dioxybenzoate, polyethylene-1,5, naphthanate, etc., and various polyamides, such as polyhexamethylene adipamide, polyhexamethylene sebacamide and polycaproamide. Polyvinyl chloride may also is included in this class.

(3) Polymers which are normally crystalline and which cannot normally be quenched from a melt in an essentially amorphous (non-crystalline) form. This class includes polyethylene (low, intermediate and high density types), polypropylene, polyvinyl fluoride and polyoxymethylene; see USP 2,768,994.

Organic polymeric film-forming materials other than the so-called organic polymeric thermoplastic polymers include the various cellulosic films such as regenerated cellulose. Viscose (an alkaline solution of cellulose xanthate) of relatively high viscosity may be extruded from a circular die in accordance with the present invention to form regenerated cellulose film in tubular form by the well-known "dry casting" technique. The process is also applicable to producing oriented tubular films from organic thermoplastic polymers in the form of homogeneous mixtures or dispersions in organic solvents, particularly organic compounds which are solvents for the polymer at elevated temperatures and are essentially non-solvents at normal temperatures. For example, high solids dispersions of polyvinyl fluoride in gamma-butyrolactone may be extruded at an elevated temperature to form a homogeneous coalesced film in tubular form which may then be cooled to a desired temperature favorable for effecting orientation by stretching and, thereafter, permitted to expand under the conditions of the applied internal pressure. Many other combinations of organic thermoplastic polymers and organic liquids, which act as latent solvents for the polymer, may be extruded as a tubular film and oriented in accordance with the present process.

In general, the temperature or temperatures at which molecular orientation of a polymeric film, formed from the above types of polymers, may be effected by stretching lies somewhere below the melting temperature or below the crystalline melting point of the polymer. In many cases a crystalline polymer will melt over a temperature range wherein the lower temperature of the range is that temperature at which the crystallites begin to disappear and the upper temperature is the crystalline melting point. With some polymers, molecular orientation of a film may be best effected by stretching the film while its temperature is within its crystalline melting point range. This appears to be true for certain types of polyethylene and other similar polyhydrocarbon films.

In the case of other polymers in film form, molecular orientation is best effected by stretching the film at a temperature which lies above its second order transition temperature (sometimes referred to as "transition" temperature or "glass" transition temperature), and considerably below its crystalline melting temperature range. This is true, for example, for polyethylene terephthalate film which should be stretched within the temperature range from about 10° C. to about 40° C. above its transition temperature which is about 70° C. This temperature range, wherein molecular orientation of the film is effected by stretching, is about 140°–170° C. below the crystalline melting point of the polymer. Normally essentially amorphous polymers, i.e., those which cannot be crystallized, and polymers which can be quenched in amorphous form but can be crystallized have what is called a "second order transition temperature" or merely "transition temperature" which is, in brief, that temperature at which (when the polymer is warmed up) a polymer makes a transition from a glassy state to an essentially rubbery state. In the rubbery state the polymer is readily stretchable, and in such a state orientation is effected by stretching the polymeric film.

The specific temperature ranges wherein molecular orientation of a polymeric film will be effected by stretching will vary from polymer to polymer, and this temperature range may be readily determined or ascertained from the literature. In all cases, however, this temperature range is below the melting point of the polymer (below the crystalline melting point in the case of crystalline polymers). In any event, this temperature is appreciably below the temperature at which polymers are formed (extruded) into films in tubular form from polymer melts, since the polymers are normally extruded at temperatures substantially above their (crystalline) melting point.

As an optional step subsequent to orientation, the expanded (oriented) tubing may be subjected to a temperature sufficiently high to heat-set or lock in the orientation of the film. This step is particularly adaptable to polymeric films which crystallize during orientation. Subsequent to heat-setting the tubing is cooled prior to wind-up.

The following examples will serve to illustrate the application of the present invention to improve the properties of polymeric films.

EXAMPLE I

A polyvinyl chloride composition consisting of 90.3% polyvinyl chloride, 6.8% of 3,5-dibutyl tin mercaptide and 2.9% "Lubricin" V-3 (substituted castor oil derivative, made by W. T. Baker Co.) was continuously extruded and oriented in an apparatus similar to that described in FIGURE 5. Molten polymer, at a temperature of about 190° C., was extruded at the rate of 13 pounds per hour from a 1" extruder equipped with a 2" circular die having an opening between the die lips (between the boundaries of the annular area) of 63 mils. The tubular film was extruded downwardly in a vertical direction.

A gas-pervious cylindrical section, at a temperature of about 90° C., fabricated from sintered bronze, was attached to the face of the circular extrusion die, this section having an inside diameter of approximately 2¼" and a length of 6½". Air at a temperature of about 25° C. and a pressure of 5 p.s.i. was supplied to the plenum of the gas-pervious cylindrical section to keep the molten tubing out of contact by not more than 10 mils with the gas-pervious surface. During passage within the cylindrical section, the tubing was cooled from a temperature of about 190° C. to a temperature of about 90° C. as measured by a radiamatic pyrometer.

The tubing advancing through the cooling section was inflated with air under a pressure of 10–11 inches of water, and as the tubing emerged from the gas-pervious section, it expanded freely 2.6 times its original diameter under the applied internal pressure to an internal diameter of 5.2" and a wall thickness of 1.2 mils. The thus-oriented tubular film was allowed to cool in the surrounding air. A pair of pinch rolls, operated at a speed of 13 feet per minute, was employed to advance the tubular film from the die and collapse the tubing for wind-up.

The physical properties of the resulting polyvinyl chloride film were as follows:

|  | Direction | |
| --- | --- | --- |
|  | Transverse | Longitudinal |
| Tensile strength (lbs./sq. in.) | 13,300 | 9,840 |
| Elongation at break (percent) | 57 | 104 |
| Tensile Modulus (lbs./sq. in.) | 473,500 | 425,700 |
| Tear Strength (gms./mil) | 15 | 68 |
| Pneumatic impact strength (kg.-cm./mil) | 3.5 | |
| Durability (average bag drop) | 27 | |

Examination of the above physical properties of the polyvinyl chloride film indicates that molecular orientation effected by the present process is in two mutually perpendicular directions with the greater orientation being in a direction transverse to the longitudinal axis of the tubing. It is significant, however, that the physical properties, measured in both directions, for the film produced in Example I are approaching balance, and the significant degree of orientation obtained is particularly reflected in the relatively high pneumatic impact strength and bag drop durability.

EXAMPLE II

Polyethylene having a melt index of 0.13 at 230° C., an inherent viscosity of 1.80 and an annealed density of 0.94 was continuously extruded and oriented in tubular film form in accordance with the process of this invention in an apparatus similar to that illustrated in FIGURE 5.

The molten polymer was extruded from a 1" extruder equipped with a 4" circular die having a lip opening of 20 mils. A cylindrical section composed of a gas-pervious sintered bronze was attached concentrically to the face of the 4" circular extrusion die. The gas-pervious cylindrical section had an inside diameter of 4½" and was 6½" in length. The temperature of the bronze surface was about 110° C. and air at about 5 p.s.i. and room temperature was pressured into the plenum. The tubing was inflated and pressurized with air at a pressure of 6" of water, and during advancing through the gas-pervious cylindrical section, the polyethylene tubing was cooled from a temperature of about 255° C. to a desired stretching temperature of 116° C. After being cooled within the gas-pervious section, the advancing tubing was allowed to expand under the applied internal pressure to an inside diameter of 8" and a wall thickness of 2.4 mils. After expansion of the tubing, it was cooled as it passed through air at room temperature. The tubing was advanced through the apparatus by pinch rolls rotating at a linear rate of 6 feet/minute.

The physical properties of the polyethylene film produced were as follows:

|  | Direction | |
| --- | --- | --- |
|  | Transverse | Longitudinal |
| Tensile strength (lbs./sq. in.) | 4,600 | 4,300 |
| Elongation at break (percent) | 900 | 600 |
| Tensile modulus (lbs./sq. in.) | 155,000 | 106,000 |
| Pneumatic impact strength (kg.-cm./mil) | 0.8 | |
| Durability (average bag drop) | 10 | |

EXAMPLES III–V

A polyvinyl chloride composition consisting of 90.3% polyvinyl chloride, 6.8% of 3,5-dibutyl tin mercaptide and 2.9% "Lubricin" V-3 was continuously extruded and oriented in an apparatus of the type illustrated in FIGURE 2. The molten polymer composition, at a temperature of about 190° C., was extruded from a 1" extruder equipped with a 2" circular die having a die lip opening of 60 mils.

A cylindrical gas-pervious quenching/expanding/cooling section was attached directly to the face of the die, this section being fabricated from sintered bronze. In this example, one of three different sizes of quenching/expanding/cooling sections was used. One was designed for expanding the tubing to a ratio of 2:1 (Example III), another for expanding 3:1 (Example IV), and another for expanding the tubing 4:1 (Example V). The relative dimensions of each of these sections, and the pressure of the air pressured into the plenums of individual portions of the sections are indicated below:

|  | Inside Diameter (inches) | Length (inches) | Air Pressure (p.s.i.) |
|---|---|---|---|
| Example III: | | | |
| Quenching section | 2¼ | 4½ | 60 |
| Expanding section | | 2½ | 60 |
| Final cooling section | 4¼ | 6½ | 3–5 |
| Example IV: | | | |
| Quenching section | 2¼ | 2½ | 60 |
| Expanding section | | 4 | 60 |
| Final cooling section | 6¼ | 6½ | 3–5 |
| Example V: | | | |
| Quenching section | 2¼ | 4½ | 60 |
| Expanding section | | 5½ | ¹ 60 then 10–12 |
| Final cooling section | 8 | 6½ | 3–5 |

¹ 60 p.s.i. for 4", then 10–12 p.s.i. for 1½".

The following details are pertinent to the examples designed to expand the film to the aforementioned three different ratios:

EXAMPLE III
*(2:1 expansion)*

| | |
|---|---|
| Pressure of air to inflate tubing | 8" of water. |
| Film output | 125 grams/minute. |
| Temperature of gas-pervious cooling section | 98° C. |
| Temperature of gas-pervious stretching section | 85° C. |
| Temperature of gas-pervious cooling section for cooling film after expansion | about 20° C. |
| Linear rate of film movement | 16 feet/minute. |

EXAMPLE IV
*(3:1 expansion)*

| | |
|---|---|
| Pressure of air to inflate tubing | 7 inches of water. |
| Film output | 140 grams/minute. |
| Temperature of gas-pervious cooling section | 100° C. |
| Temperature of gas-pervious stretching section | 88° C. |
| Temperature of gas-pervious cooling section for cooling film after expansion | about 20° C. |
| Linear rate of film movement | 19.5 feet/minute. |

EXAMPLE V
*(4:1 expansion)*

| | |
|---|---|
| Pressure of air to inflate tubing | 12 inches of water. |
| Film output | 137 grams/minute. |
| Temperature of gas-pervious cooling section | 120° C. |
| Temperature of gas-pervious stretching section | 90° C. |
| Temperature of gas-pervious cooling section for cooling film after expansion | about 20° C. |
| Linear rate of film movement | 20 feet/minute. |

The following table summarizes some of the physical properties of the films produced in the examples.

| | Example III | Example IV | Example V |
|---|---|---|---|
| Final Thickness (mils) | 1.6 | 1.3 | 1.1 |
| Shrinkage, (percent) LD/TD at 100° C. | 8/17 | 7.5/33 | 12.8/42.3 |
| Tensile Strength (p.s.i.) LD/TD | 7,600/ 11,800 | 7,760/ 13,500 | 8,690/ 20,600 |
| Elongation (percent) LD/TD | 160/125 | 123/71 | 137/39 |
| Tensile Modulus (p.s.i.) LD/TD | 409,000/ 505,000 | 390,000/ 463,000 | 365,000/ 595,000 |
| Pneumatic Impact Strength (kg.-cm./mil) | 2.0 | 3.4 | 4.2 |

TD—transverse direction; LD—longitudinal or machine direction.

EXAMPLE VI

The apparatus used for carrying out this example is shown in FIGURE 6 wherein molten polyethylene terephthalate is extruded in tubular form over a gas-pervious mandrel cooled to a temperature to quench the moving tubular film. The tubular film is then advanced between two pull rolls, which collapse the film. The tubular film is then advanced over a frusto-conical stretching mandrel fabricated from a gas-pervious metal wherein the tubular film is expanded while at a temperature at which molecular orientation is effected by stretching.

Molten polyethylene terephthalate at a temperature of 275° C. was extruded continuously in the form of a tubular film through a circular die of 2.3" outside diameter at a throughput of 10 pounds of polymer/hour. The molten tubing which issued from a die having a lip opening of 28 mils was quenched by advancing it over the gas-pervious mandrel. The gas-pervious mandrel was fabricated from sintered bronze, and the surface of the mandrel was cooled by introducing cold water into copper tubes embedded in the mandrel. The overall length of the mandrel was 6". The outside diameter of the mandrel at a point adjacent to the circular die was 1.94", and the mandrel tapered 8 mils/inch to a smaller diameter. This tapered construction permitted shrinkage of the advancing tubing during the quenching. The mandrel was cooled by introducing water at a temperature of about 28° C. into the copper tubing in the mandrel at a rate of about 2 gallons/minute. The mandrel was pressured with air at a pressure of about 10 pounds/square inch. The quenched tubular film was advanced at a rate of about 20 feet/minute through pull rolls which collapsed the tubing and served to isolate the quenching step from the orientation step.

After passing through the pull rolls, the tubular film was then advanced over a frusto-conical stretching mandrel composed of sintered bronze. This stretching mandrel had the dimensions to effect an expansion of about 3×. Hot water at a temperature of 95° C. was introduced into copper tubing embedded in the mandrel in order to maintain the gas-pervious surfaces of the mandrel at a temperature of about 95° C. during tubular film stretching. A cooling ring installed at the end of the stretching mandrel, this ring being composed of several coils of copper tubing, served to cool the stretched tubing prior to its being slit. Cold water at a temperautre of about 27° C. was introduced into this cooling ring to cool the surface of the mandrel. Air at a pressure of about 20 p.s.i. was introduced into the gas-pervious mandrel to provide an air pressure against the inner walls of the tubing during stretching to maintain the tubing out of contact by no more than about 10 mils with solid surfaces of the mandrel. Slitting knives positioned on opposite sides of the tubing served to slit the tubing into two continuous lengths of film which were wound up on separate winding rolls.

The tubular film was stretched to about 3× in a transverse direction and to an extent of about 1.25× in the longitudinal direction. The physical properties of the film after stretching are listed below:

|  | Direction | |
| --- | --- | --- |
|  | Transverse | Longitudinal |
| Tensile Strength (p.s.i.) | 18,800 | 8,700 |
| Elongation (percent) | 70 | 240 |
| Tensile Modulus (p.s.i.) | 600,000 | 360,000 |
| Thickness (mils) | 0.75 | |
| Pneumatic Impact Strength (kg.-cm./mil) | 5.2 | |

From the foregoing it will be apparent to persons skilled in the art that this invention is capable of relatively wide modification without departure from its essential spirit, wherefor it is intended to be limited only by the scope of the following claims.

What is claimed is:

1. Process for preparing thermoplastic polymeric tubing which comprises the steps, in sequence, of extruding the thermoplastic polymeric material in the form of molten tubing, advancing said tubing in proximity to, but out of contact with at least one shaping surface; cooling said tubing while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing.

2. Process for preparing thermoplastic polymeric tubing which comprises the steps, in sequence, of extruding the thermoplastic polymeric material in the form of molten tubing; advancing said tubing within, but out of contact with at least one confining shaping surface; cooling said tubing while simultaneously applying a gaseous medium transverse to the direction of advancement of said advancing tubing to maintain said tubing in proximity to, but out of contact with said confining shaping surface; expanding said tubing to a larger diameter by the application of a gaseous medium within said tubing.

3. Process for preparing thermoplastic polymeric tubing which comprises the steps, in sequence, of extruding the thermoplastic polymeric material in the form of molten tubing; advancing said tubing over, but out of contact with at least one shaping surface; cooling said tubing while simultaneously applying a gaseous medium transverse to the direction of advancement of said advancing tubing to maintain said tubing in proximity to, but out of contact with said shaping surface; expanding said tubing to a larger diameter by the application of said gaseous medium.

4. Process for preparing thermoplastic polymeric tubing which comprises the steps, in sequence, of extruding the thermoplastic polymeric material in the form of molten tubing; advancing said tubing in proximity to, but out of contact with at least one shaping surface; cooling said tubing while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing while maintaining said tubing in proximity to, but out of contact with a shaping surface.

5. Process for preparing thermoplastic polymeric tubing which comprises the steps, in sequence, of extruding the thermoplastic polymeric material in the form of molten tubing; advancing said tubing within, but out of contact with at least one confining shaping surface; cooling said tubing while simultaneously applying a gaseous medium transverse to the direction of advancement of said advancing tubing to maintain said tubing in proximity to, but out of contact with said confining shaping surface; expanding said tubing to a larger diameter by the application of a gaseous medium within said tubing while maintaining said tubing in proximity to, but out of contact with a confining shaping surface.

6. Process for preparing thermoplastic polymeric tubing which comprises the steps, in sequence, of extruding the thermoplastic polymeric material in the form of molten tubing; advancing said tubing over, but out of contact with at least one shaping surface; cooling said tubing while simultaneously applying a gaseous medium transverse to the direction of advancement of said advancing tubing to maintain said tubing in proximity to, but out of contact with said shaping surface; expanding said tubing to a larger diameter by the application of said gaseous medium while maintaining said tubing in proximity to, but out of contact with a shaping surface.

7. Process for preparing thermoplastic polymeric tubing which comprises the steps, in sequence, of extruding the thermoplastic polymeric material in the form of molten tubing; advancing said tubing in proximity to, but out of contact with at least one shaping surface; cooling said tubing to a temperature at which molecular orientation will be effected by stretching while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing to effect molecular orientation therein.

8. Process for preparing thermoplastic polymeric tubing which comprises the steps, in sequence, of extruding the thermoplastic polymeric material in the form of molten tubing; advancing said tubing in proximity to, but out of contact with at least one shaping surface; cooling said tubing to a temperature at which molecular orientation will be effected by stretching while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing while maintaining said tubing in proximity to, but out of contact with a shaping surface to effect molecular orientation therein.

9. Process for preparing polyethylene terephthalate tubing which comprises the steps, in sequence, of extruding polyethylene terephthalate in the form of molten tubing; advancing said tubing in proximity to, but out of contact with at least one shaping surface; cooling said tubing to a temperature within the range of 80° to 110° C. while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing to effect molecular orientation therein.

10. Process for preparing polyvinyl chloride tubing which comprises the steps, in sequence, of extruding polyvinyl chloride in the form of molten tubing; advancing said tubing in proximity to, but out of contact with at least one shaping surface; cooling said tubing to a temperature within the range of 70° to 110° C. while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing to effect molecular orientation therein.

11. Process for preparing polyethylene tubing which comprises the steps, in sequence, of extruding polyethylene in the form of molten tubing; advancing said tubing in proximity to, but out of contact with at least one shaping surface; cooling said tubing to a temperature within the range of 90° to 130° C. while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing to effect molecular orientation therein.

12. An apparatus for preparing thermoplastic polymeric tubing comprising an extruder; a die having an annular orifice through which to extrude thermoplastic material in the form of tubing; a substantially rigid gas-pervious shaping member adjacent to said extrusion means; means for cooling said shaping member; means for advancing said tubing in proximity to said shaping member; means for supplying a gaseous medium through said gas-pervious shaping member transverse to said tubing to sustain the tubing out of contact with said shaping member; and means for supplying a gaseous medium within said tubing to expand said tubing.

13. Apparatus as in claim 12 wherein the gas-pervious shaping member is of hollow bore of circular cross section and of larger diameter than the diameter of the annular die of said extrusion means adapted to confine the advancing tubing.

14. Apparatus as in claim 12 wherein the gas-pervious shaping member is of circular cross section and of smaller diameter than the diameter of the annular die of said extrusion means adapted to receive said advancing tubing therearound and wherein said gaseous medium supplied to sustain said tubing out of contact with said shaping member is adapted also to expand said tubing.

15. Process for treating thermoplastic polymeric tubing which comprises the steps, in sequence, of advancing a thermoplastic polymeric material in the form of tubing at an elevated temperature in proximity to, but out of contact with at least one shaping surface; cooling said tubing while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing.

16. Process for treating thermoplastic polymeric tubing which comprises the steps, in sequence, of advancing a thermoplastic polymeric material in the form of tubing in proximity to, but out of contact with at least one shaping surface; bringing said tubing to a temperature at which molecular orientation will be effected by stretching while simultaneously applying a gaseous medium transverse to the direction of advancement of said advancing tubing to maintain said tubing in proximity to, but out of contact with said shaping surface; expanding said tubing to a larger diameter by the application of a gaseous medium within said tubing to effect molecular orientation therein.

References Cited in the file of this patent

UNITED STATES PATENTS

| | | |
|---|---|---|
| 2,387,886 | Devol | Oct. 30, 1945 |
| 2,519,375 | Jargstorff | Aug. 22, 1950 |
| 2,562,135 | Strobel | July 24, 1951 |
| 2,708,772 | Moncrieff | May 24, 1955 |